United States Patent [19]

Baika et al.

[11] Patent Number: 5,343,839

[45] Date of Patent: Sep. 6, 1994

[54] TWO-STROKE ENGINE

[75] Inventors: Toyokazu Baika; Koichi Nakae, both of Susono, Japan

[73] Assignee: Toyota Jidosha Kabushiki Kaisha, Aichi, Japan

[21] Appl. No.: 158,278

[22] Filed: Nov. 29, 1993

[30] Foreign Application Priority Data

Dec. 18, 1992 [JP] Japan .................. 4-339151

[51] Int. Cl.⁵ .............................. F02B 25/20
[52] U.S. Cl. .......................... 123/257; 123/65 VD; 123/65 PE
[58] Field of Search ............ 123/65 VD, 257, 432, 123/302, 315, 65 PE, 253

[56] References Cited

U.S. PATENT DOCUMENTS

| | | | |
|---|---|---|---|
| 4,840,147 | 6/1989 | Tanahashi et al. | 123/65 VD |
| 5,063,886 | 11/1991 | Kanamura et al. | 123/65 VD |
| 5,070,834 | 12/1991 | Ueno et al. | 123/253 |
| 5,125,380 | 6/1992 | Nakae et al. | 123/257 |
| 5,230,312 | 7/1993 | Baika et al. | 123/257 |

FOREIGN PATENT DOCUMENTS 4-112904  4/1992  Japan .

Primary Examiner—Tony M. Argenbright
Assistant Examiner—M. Macy
Attorney, Agent, or Firm—Oliff & Berridge

[57] ABSTRACT

A two-stroke engine comprising two exhaust valves and two intake valves. These exhaust valves and these intake valves are arranged on the peripheral portion of the inner wall of the cylinder head, and one additional exhaust valve is arranged on the central portion of the inner wall of the cylinder head. The valve openings of the two intake valves, which are located on the exhaust valves side, are masked by the masking walls.

14 Claims, 6 Drawing Sheets

TWO-STROKE ENGINE

BACKGROUND OF THE INVENTION

1. Field of the Invention

The present invention relates to a two-stroke engine.

2. Description of the Related Art

In a known two-stroke engine, three exhaust valves are arranged on the peripheral portion of the inner wall of the cylinder head, and a pair of intake valves are arranged on the peripheral portion of the inner wall of the cylinder head at a position opposite to the exhaust valves. The valve opening of each intake valve, which is located on the exhaust valve side, is masked by the masking wall to prevent fresh air from flowing out from the valve opening of each intake valve, which is located on the exhaust valve side. The fresh air flowing out from the unmasked valve opening of each intake valve, which is located on the opposite side of the exhaust valve, is caused to flow downward along the inner wall of the cylinder bore beneath the intake valve. Then, the fresh air flows along the top face of the piston and then flows upward along the inner wall of the cylinder bore beneath the exhaust valve (see Japanese Unexamined Patent Publication No. 4-112904). This two-stroke engine is designed so as to scavenge burned gas as efficiently as possible by causing the fresh air flowing out from the intake valves to flow along the periphery of the combustion chamber in the form of a loop.

However, if the fresh air is caused to flow along the periphery of the combustion chamber in a looplike manner, the unburned gas existing in the periphery of the combustion chamber can be sufficiently scavenged by the fresh air, but the unburned gas existing at the central portion of the combustion chamber is not scavenged by the fresh air and thus stays in the combustion chamber. As a result, a problem arises in that it is impossible to sufficiently scavenge all of the unburned gas in the combustion chamber.

SUMMARY OF THE INVENTION

An object of the present invention is to provide a two-stroke engine capable of sufficiently scavenging all of the unburned gas in the combustion chamber.

According to the present invention, there is provided a two-stroke engine having a piston, a cylinder head and a combustion chamber formed between the piston and the cylinder head, the engine comprising: at least one exhaust valve arranged on a peripheral portion of an inner wall of the cylinder head; at least one intake valve arranged on a peripheral portion of the inner wall of the cylinder head at a position opposite to the exhaust valve; preventing means for preventing an inflow of fresh air into the combustion chamber from a valve opening of the intake valve, which is located on the exhaust valve side, and causing the fresh air to flow into the combustion chamber from a valve opening of the intake valve, which is located opposite to the exhaust valve, to cause the fresh air to flow along a periphery of the combustion chamber; and an additional valve arranged at a central portion of the inner wall of the cylinder head to discharge burned gas from the combustion chamber.

The present invention may be more fully understood from the description of a preferred embodiment of the invention set forth below, together with the accompanying drawings.

DESCRIPTION OF A PREFERRED EMBODIMENT

Figure 1:
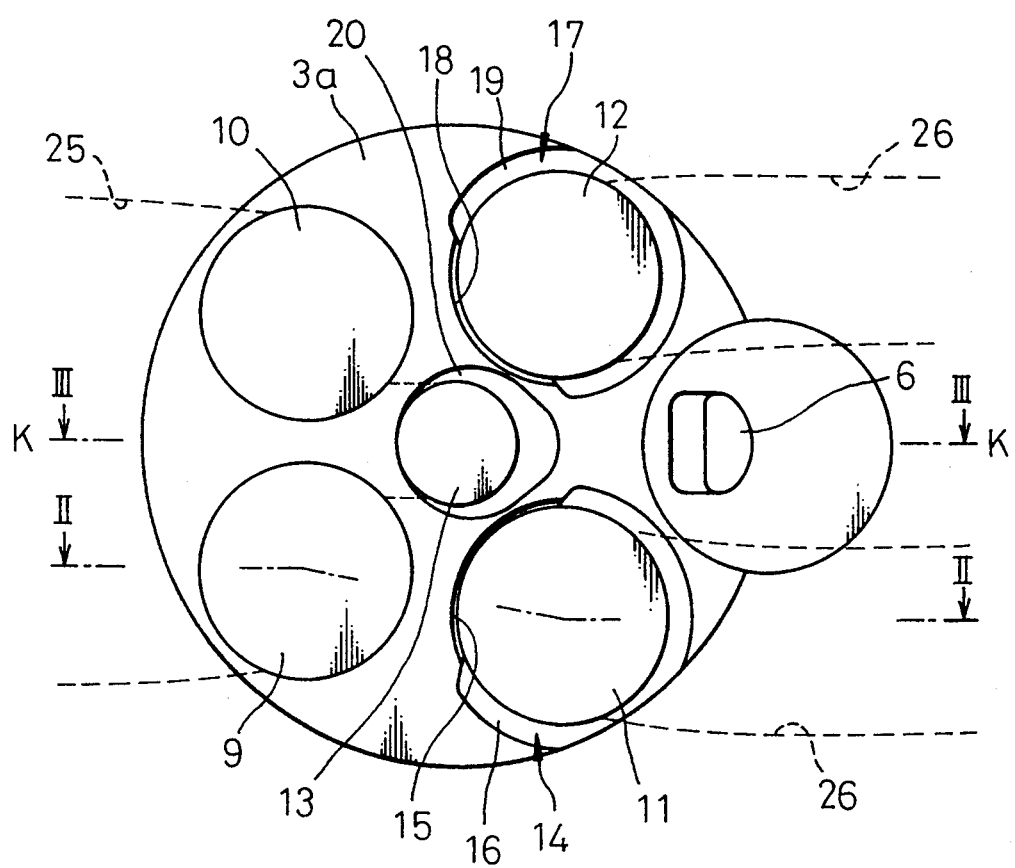
FIG. 1 is a view illustrating the inner wall of the cylinder head.
Figure 2:
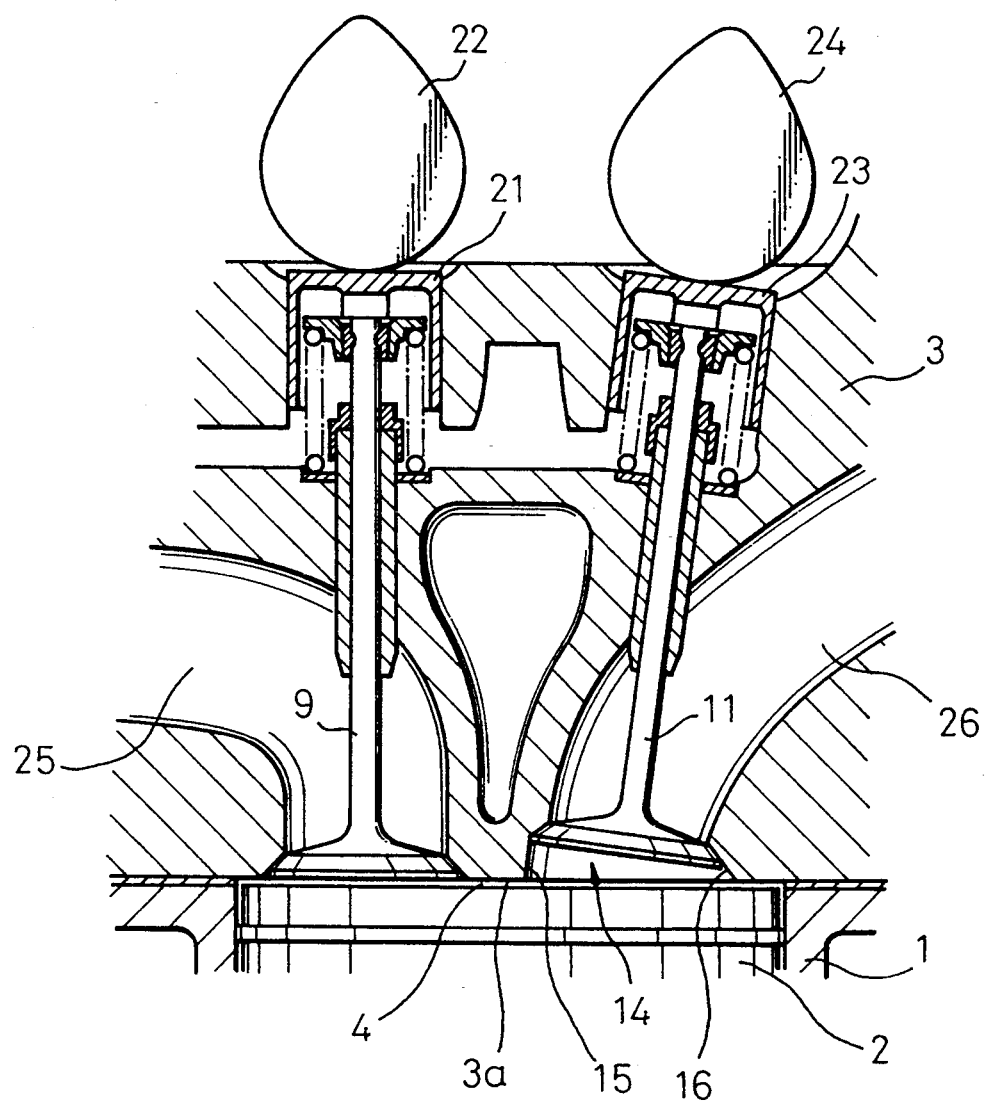
FIG. 2 is a cross-sectional side view of an engine, taken along the line II—II in FIG. 1.
Figure 3:
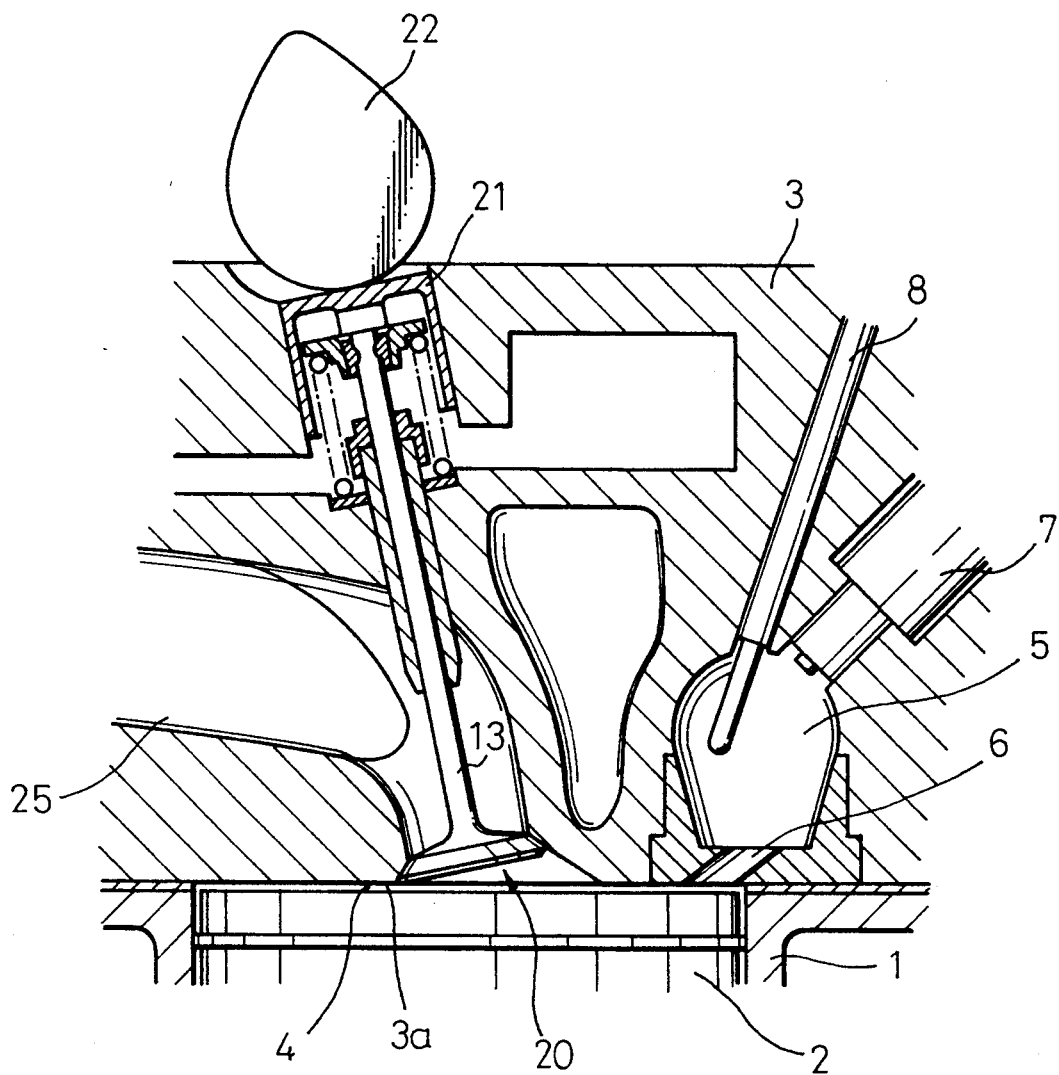
FIG. 3 is a cross-sectional side view of the engine, taken along the line III—III in FIG. 1.

FIGS. 1 through 3 illustrate the case where the present invention is applied to a two-stroke diesel engine. However, the present invention may be applied to a two-stroke spark-ignition engine.

Referring to FIGS. 1 through 3, reference numeral 1 designates a cylinder block, 2 a piston reciprocally movable in the cylinder block 1, 3 a cylinder head fixed to the cylinder block 1, and 4 a main chamber formed between the top face of the piston 2 and the inner wall 3a of the cylinder head 3; 5 designates an auxiliary chamber formed in the cylinder head 3 above the peripheral portion of the inner wall 3a of the cylinder head 3, 6 an opening of the auxiliary chamber 5, which is open to the main chamber 4, 7 a fuel injection for injecting fuel into the auxiliary chamber 5, and 8 a glow plug arranged in the auxiliary chamber 5.

In the embodiment illustrated in FIGS. 1 through 3, as illustrated in FIG. 1, a pair of exhaust valves 9, 10 are arranged on the peripheral portion of the inner wall 3a of the cylinder head 3, and a pair of intake valves 11, 12 are arranged on the peripheral portion of the inner wall 3a of the cylinder head 3 at a position opposite to the exhaust valves 9, 10. In addition, a third exhaust valve, i.e., an additional exhaust valve 13 is arranged at the central portion of the inner wall 3a of the cylinder head 3. As illustrated in FIG. 1, the exhaust valves 9, 10 are symmetrically arranged with respect to a symmetrical plane K—K including the axis of the cylinder, and the intake valves 11, 12 are also symmetrically arranged with respect to the symmetrical plane K—K. In addition, the opening 6 of the auxiliary chamber 5 is arranged on the peripheral portion of the inner wall 3a of the cylinder head 3, which portion is surrounded by a pair of the intake valves 11, 12 and the exhaust valve 13, and furthermore, the exhaust valve 13 and the opening 6 are arranged on the symmetrical plane K—K. Accordingly, in the embodiment illustrated in FIGS. 1 through 3, the arrangement is such that a pair of the exhaust valves 9, 10, a pair of the intake valves 11, 12 and the opening 6 are approximately equiangularly arranged on the peripheral portion of the inner wall 3a of the cylinder head 3, and the additional exhaust valve 13 is arranged at the central portion of the inner wall 3a of the cylinder head 3.

As illustrated in FIGS. 1 and 2, a recessed portion 14 is formed on the inner wall 3a of the cylinder head 3, and the intake valve 11 is arranged in the deep interior of the recessed portion 14. The inner circumferential wall portion 15 of the recessed portion 14, which is located on the exhaust valves side, has a cylindrical shape extending along the outer periphery of the intake valve 11, and the remaining inner circumferential wall portion 16 of the recessed portion 14 other than the cylindrical inner circumferential wall portion 15 has a conical shape diverging toward the main chamber 4. Accordingly, the valve opening of the intake valve 11, which faces the cylindrical inner circumferential wall portion 15, is masked by this wall portion 15, and thus this cylindrical inner circumferential wall portion 15 forms a masking wall for masking the valve opening of the intake valve 11, which is located on the exhaust valves side. In the embodiment illustrated in FIGS. 1 through 3, the masking wall 15 extends toward the main chamber 4 to a position lower than the intake valve 11 when the intake valve 11 is in the maximum lift position, and thus the valve opening of the intake valve 11, which is located on the exhaust valves side, is masked by the masking wall 15 for the entire time for which the intake valve 11 is open. However, the height of the masking wall 15 may be slightly lowered to mask the valve opening of the intake valve 11 only when the amount of the valve lift of the intake valve 11 is small.

In addition, as illustrated in FIG. 1, a recessed portion 17 having a shape which is symmetrical with the recessed portion 14 with respect to the symmetrical plane K—K is formed on the inner wall 3a of the cylinder head 3, and the intake valve 12 is arranged in the deep interior of the recessed portion 17. The inner circumferential wall portion 18 of the recessed portion 17, which is located on the exhaust valves side, has a cylindrical shape extending along the outer periphery of the intake valve 12, and the remaining inner circumferential wall portion 19 of the recessed portion 17 other than the cylindrical inner circumferential wall portion 18 has a conical shape diverging toward the main chamber 4. Accordingly, the valve opening of the intake valve 12, which faces the cylindrical inner circumferential wall portion 18, is masked by this wall portion 18, and thus this cylindrical inner circumferential wall portion 18 forms a masking wall for masking the valve opening of the intake valve 12, which is located on the exhaust valves side. In the embodiment illustrated in FIGS. 1 through 3, similarly to the masking wall 15, the masking wall 18 extends toward the main chamber 4 to a position lower than the intake valve 12 when the intake valve 12 is in the maximum lift position, and thus the valve opening of the intake valve 12, which is located on the exhaust valves side, is masked by the masking wall 18 for the entire time for which the intake valve 12 is open. However, the height of the masking wall 18 also may be slightly lowered to mask the valve opening of the intake valve 12 only when the amount of the valve lift of the intake valve 12 is small.

Furthermore, as illustrated in FIGS. 1 and 3, a recessed portion 20 is formed on the inner wall 3a of the cylinder head 3, and the exhaust valve 13 is arranged in the deep interior of the recessed portion 20. The inner circumferential wall of the recessed portion 20, other than a portion located on the exhaust valve side, has a conical shape diverging toward the main chamber 4 so that the valve opening of the exhaust valve 13 opens as a whole to the interior of the main chamber 4 when the exhaust valve 13 is open. Accordingly, for all the exhaust valves 9, 10, 13, no masking wall is provided, and thus, when the exhaust valves 9, 10, 13 open, the valve openings of the exhaust valves 9, 10, 13 open as a whole to the interior of the main chamber 4.

In the embodiment illustrated in FIGS. 1 through 3, all the exhaust valves 9, 10, 13 are driven by a common cam shaft 22 via corresponding valve lifters 21 which are slidably inserted into the cylinder head 3, and all the intake valves 11, 12 are driven by a common cam shaft 24 via corresponding valve lifters 23 which are slidably inserted into the cylinder head 3. Namely, all the exhaust valves 9, 10, 13 are directly driven by the common cam shaft 22, positioned on the axes of the exhaust valves 9, 10, 13, without routing a rocker arm, and all the intake valves 11, 12 are also directly driven by the common cam shaft 24, positioned on the axes of the intake valves 11, 12 without routing a rocker arm. In addition, an exhaust port 25 common to all the exhaust valves 9, 10, 13 is formed in the cylinder head 3, and a pair of intake ports 26 extending to the intake valves 11, 12 on each side of the auxiliary chamber 5 are formed in the cylinder head 3.

Figure 4:
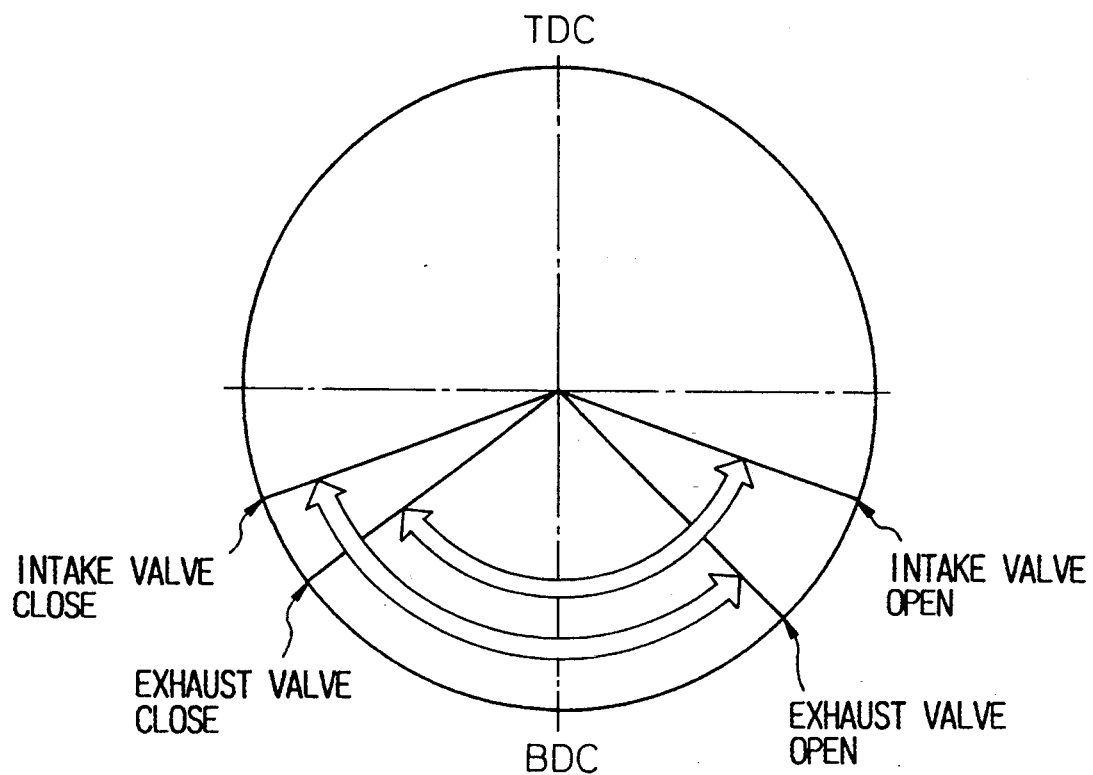
FIG. 4 is a diagram illustrating the opening times of the exhaust valves and the intake valves.

FIG. 4 illustrates the opening times of the exhaust valves 9, 10, 13 and the intake valves 11, 12. As illustrated in FIG. 4, the exhaust valves 9, 10, 13 open earlier than the intake valves 11, 12, and the exhaust valves 9, 10, 13 are closed earlier than the intake valves 11, 12.

Figure 5:
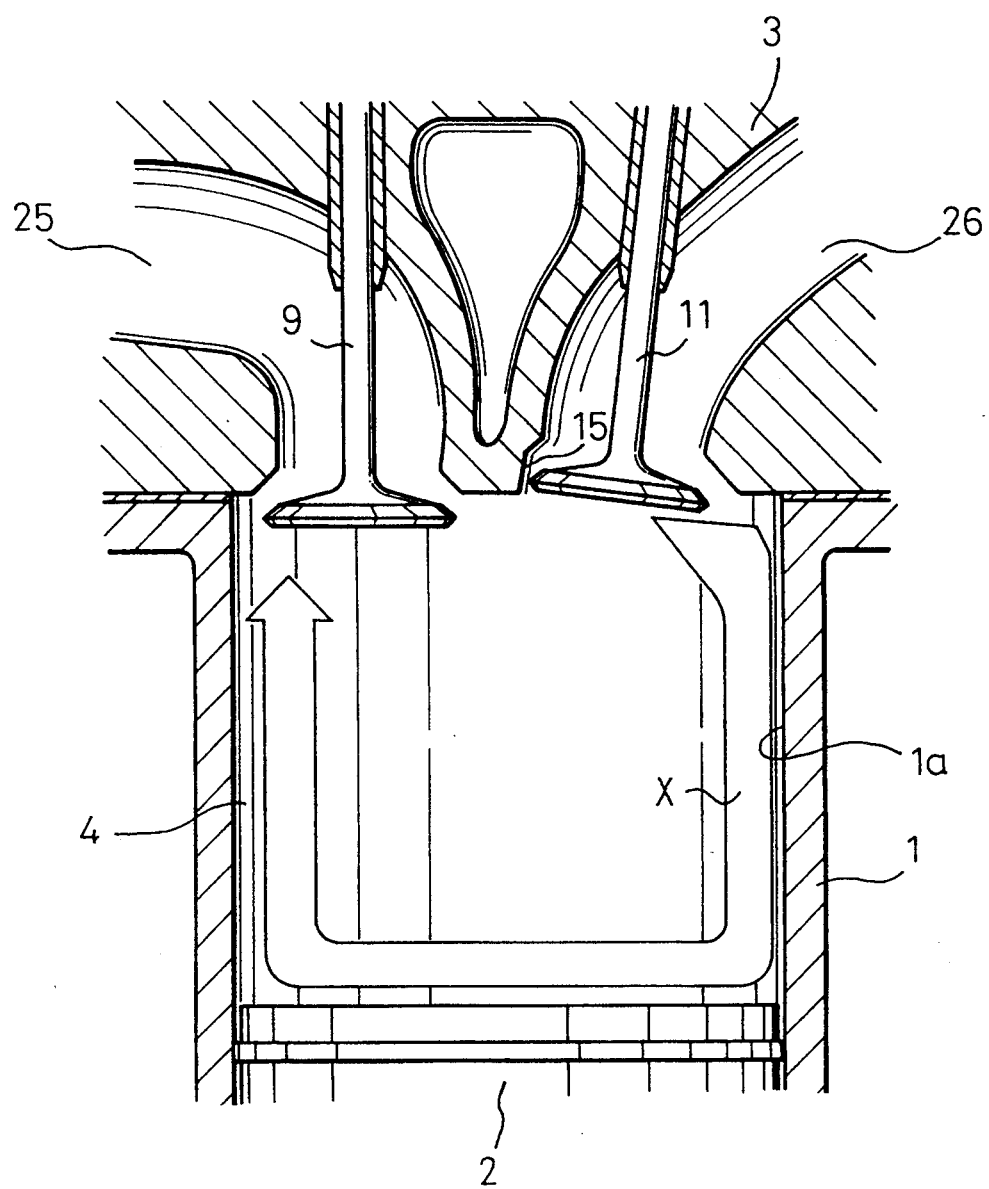
FIG. 5 is a cross-sectional side view of the engine, taken along the same line as in FIG. 2.
Figure 6:
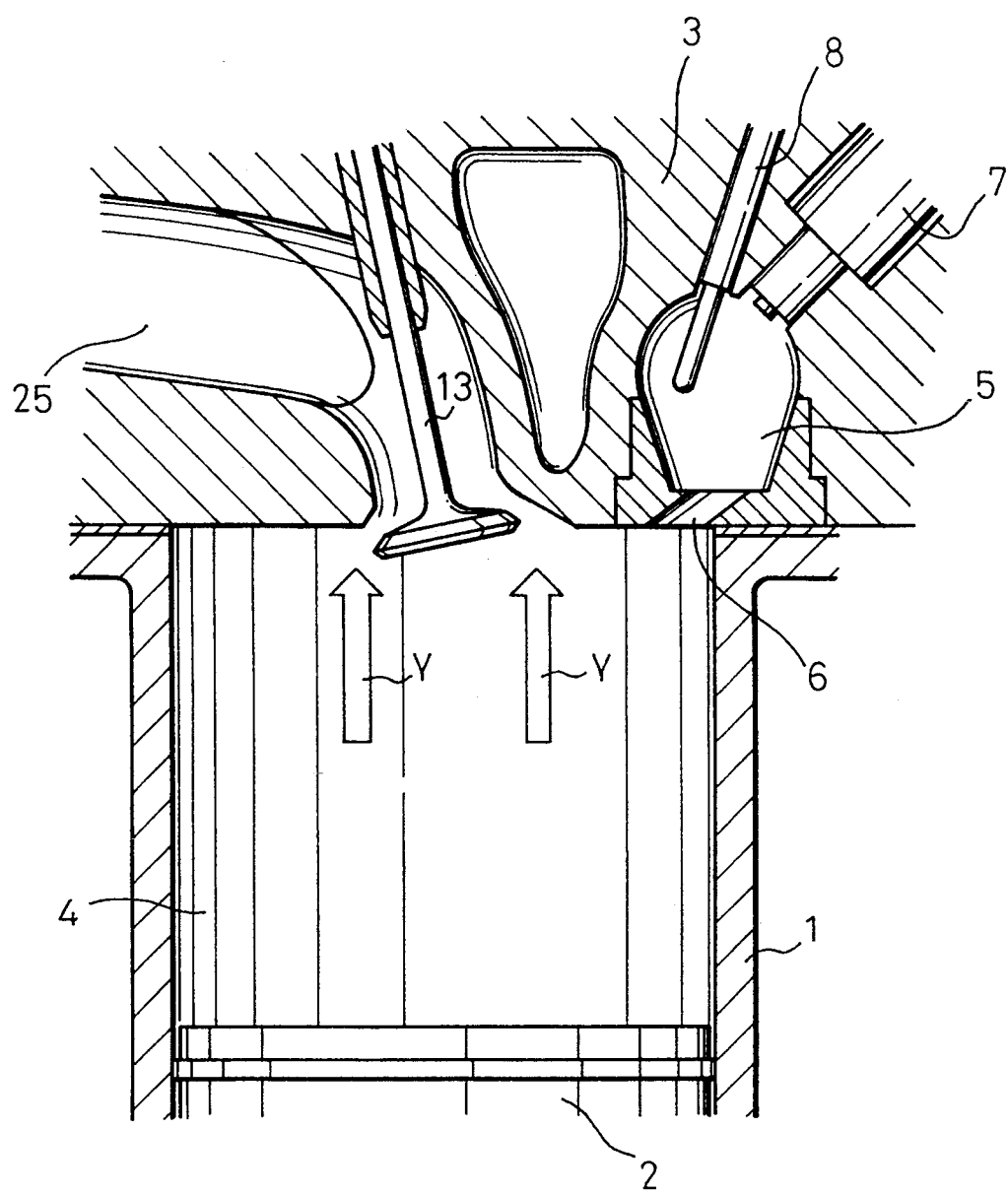
FIG. 6 is a cross-sectional side view of the engine, taken along the same line as in FIG. 3.

Next, the operation of the two-stroke diesel engine illustrated in FIGS. 1 through 3 will be described with reference to FIGS. 5 and 6.

As mentioned above, the exhaust valves 9, 10, 13 open earlier than the intake valves 11, 12. When the exhaust valves 9, 10, 13 open, the unburned gas in the main chamber 4 is abruptly discharged into the exhaust port 25. Namely, the blow down occurs. As a result, the pressure in the main chamber 4 abruptly drops. If the pressure in the main chamber 4 drops, the unburned gas in the auxiliary chamber 5 flows out into the main chamber 4 via the opening 6.

When the intake valves 11, 12 open, the fresh air fed into the intake ports 26 from the mechanically driven supercharger (not shown) driven by the engine is fed into the main chamber 4 via the intake valves 11, 12. At this time, since the valve openings of the intake valves 11, 12, which are located on the exhaust valves side, are masked by the corresponding masking walls 15, 18 as mentioned above, the fresh air flows into the main chamber 4 via the valve openings of the intake valves 11, 12, which are located on the opposite side of the exhaust valves 9, 10, 13. In this case, since the two intake valves 11, 12 are arranged on the peripheral portion of the inner wall 3a of the cylinder head 3, the fresh air fed from the intake valves 11, 12 flows downward along the inner wall 1a of the cylinder bore beneath the intake valves 11, 12, as illustrated by the arrows X in FIG. 5. Then, the fresh air flows along the top face of the piston 2 and then flows upward along the inner wall 1a of the cylinder bore beneath the exhaust valves 9, 10. Namely, the fresh air fed from the intake valves 11, 12 flows along the periphery of the main chamber 4 in the form of a loop, and the unburned gas in the main chamber 4 is discharged from the exhaust valves 9, 10 by the fresh air X flowing in the form of a loop. Accordingly, the periphery of the main chamber 4 is scavenged by the fresh air X fed from the intake valves 11, 12.

In addition, when the fresh air X flows along the top face of the piston 2, a part of the unburned gas existing in the vicinity of the top face of the piston 2 is pushed away upward by the fresh air X. As a result, the unburned gas existing in the central portion of the main chamber 4 is pushed upward toward the exhaust valve 13 as illustrated by the arrows Y in FIG. 6, and the burned gas thus pushed upward is discharged into the exhaust port 25 via the exhaust valve 13. In this way, if the exhaust valve 13 is arranged at the central portion of the inner wall 3a of the cylinder head 3 the unburned gas existing in the central portion of the main chamber 4 is scavenged by the fresh air X fed from the intake valves 11, 12. As mentioned above, since the peripheral portion and the central portion of the main chamber 4 is scavenged by the fresh air fed from the intake valves 11, 12, the entire interior of the main chamber 4 is scavenged by the fresh air fed from the intake valves 11, 12.

When the exhaust valves 9, 10, 13 are closed, and the intake valves 11, 12 are closed, the gas in the main chamber 4 is forced into the auxiliary chamber 5 via the opening 6 due to the upward movement of the piston 2. As mentioned above, since the entire interior of the main chamber 4 is sufficiently scavenged, the gas containing a large amount of fresh air therein is forced into the auxiliary chamber 5, and thus fuel injected into the auxiliary chamber 5 by the fuel injector 7 is properly burned.

If the pressure in the main chamber 4 is high when the intake valves 11, 12 open, the burned gas in the main chamber 4 flows back into the intake port 26. However, if such a flow back of the burned gas occurs, the mechanically driven supercharger must do an excessive amount of work for returning the burned gas, which has flown back, to the main chamber 4 and then discharging this burned gas into the exhaust port 25, and as a result, the loss of the output power of the engine is increased by an amount corresponding to the excessive work of the supercharger. To prevent the burned gas from flowing back into the intake port 26, the pressure produced in the main chamber 4 when the intake valves 11, 12 open must be lowered. To this end, it is necessary to discharge the burned gas into the exhaust port 25 as quickly as possible when the exhaust valves 9, 10, 13 open.

However, a time interval between the opening operation of the exhaust valves 9, 10, 13 and the opening operation of the intake valves 11, 12 is extremely short, and, in order to quickly discharge the unburned gas during such a short time interval, it is necessary to open the exhaust valves 9, 10, 13 at a high speed. In this case, if the exhaust valves 9, 10, 13 are driven via rocker arms, the opening speeds of the exhaust valves 9, 10, 13 become low because of the elastic deformation, etc., of the rocker arms. Accordingly, in the embodiment according to the present invention, to increase the opening speeds of the exhaust valves 9, 10, 13, the exhaust valves 9, 10, 13 are directly driven by the cam shaft 22 without routing a rocker arm.

According to the present invention, by arranging an additional exhaust valve at the central portion of the inner wall of the cylinder head, it is possible to sufficiently scavenge the entire interior of the combustion chamber.

While the invention has been described by reference to a specific embodiment chosen for purposes of illustration, it should be apparent that numerous modifications could be made thereto by those skilled in the art without departing from the basic concept and scope of the invention.

We claim:

1. A two-stroke engine having a piston, a cylinder head and a combustion chamber formed between the piston and the cylinder head, said engine comprising:

at least one exhaust valve arranged on a peripheral portion of an inner wall of the cylinder head;

at least one intake valve arranged on a peripheral portion of the inner wall of the cylinder head at a position opposite to said exhaust valve;

preventing means for preventing an inflow of fresh air into the combustion chamber from a portion of the valve opening of said intake valve which is located on the exhaust valve side, and causing the fresh air to flow into the combustion chamber from a portion of the valve opening of said intake valve which is located at a position opposite to said exhaust valve, to cause the fresh air to flow along a periphery of the combustion chamber; and an auxiliary exhaust valve arranged in the center of the inner wall of the cylinder head to discharge burned gas from the combustion chamber.

2. A two-stroke engine according to claim 1, wherein said preventing means comprises a masking wall which masks the valve opening of said intake valve, which is located on the exhaust valve side.

3. A two-stroke engine according to claim 2, wherein said masking wall is formed by a cylindrical inner circumferential wall of a recessed portion which is formed on the inner wall of the cylinder head for receiving said intake valve therein.

4. A two-stroke engine according to claim 2, wherein said masking wall masks the valve opening of said intake valve for the entire time for which said intake valve is open.

5. A two-stroke engine according to claim 2, wherein said masking wall masks the valve opening of said intake valve only when an amount of valve lift of said intake valve is small.

6. A two-stroke engine according to claim 1, wherein the valve openings of said exhaust valve and said auxiliary exhaust valve open along an entire periphery of each exhaust valve to an interior of the combustion chamber.

7. A two-stroke engine according to claim 1, wherein said auxiliary exhaust valve has a valve head having a diameter which is smaller than that of a valve head of said exhaust valve.

8. A two-stroke engine according to claim 1, wherein two exhaust valves are arranged on the peripheral portion of the inner wall of the cylinder head, and two intake valves are arranged on the peripheral portion of the inner wall of the cylinder head at a position opposite to said exhaust valves, said preventing means preventing the inflow of the fresh air into the combustion chamber from a portion of the valve openings of said intake valves which are located on the exhaust valves side, and causing the fresh air to flow into the combustion chamber from a portion of the valve openings of said intake valves which are located on the opposite of said exhaust valves side, to cause the fresh air to flow along the periphery of the combustion chamber.

9. A two-stroke engine according to claim 8, further comprising an auxiliary chamber having a fuel injector therein, wherein said auxiliary chamber has an opening which is open to the combustion chamber.

10. A two-stroke engine according to claim 9, wherein said opening of said auxiliary chamber is open to the combustion chamber at the peripheral portion of the inner wall of the cylinder head, which portion is located between said intake valves, and said opening of said auxiliary chamber is surrounded by said intake valves and said auxiliary exhaust valve.

11. A two-stroke engine according to claim 10, wherein said two exhaust valves, said two intake valves and said opening of said auxiliary chamber are approximately equiangularly arranged on the peripheral portion of the inner wall of the cylinder head about said additional valve.

12. A two-stroke engine according to claim 9, further comprising a pair of intake ports extending to said corresponding intake valves on each side of said auxiliary chamber.

13. A two-stroke engine according to claim 8, wherein said two intake valves are driven by a common cam shaft, and said two exhaust valves and said auxiliary exhaust valve are driven by a common cam shaft.

14. A two-stroke engine according to claim 13, wherein said cam shaft for driving said two intake valves is arranged on axes of said two intake valves, and said cam shaft for driving said two exhaust valves and said auxiliary exhaust valve are arranged on axes of said two exhaust valves and said auxiliary exhaust valve.

* * * * *